United States Patent
Al Buraiky et al.

(10) Patent No.: US 12,256,359 B2
(45) Date of Patent: Mar. 18, 2025

(54) SECURE HYBRID INTEGRATED PRIVATE 5G DEPLOYMENT ARCHITECTURE

(71) Applicant: SAUDI ARABIAN OIL COMPANY, Dhahran (SA)

(72) Inventors: Salah M. S. Al Buraiky, Dhahran (SA); Abdullah A. Alrumaih, Khobar (SA); Abdullah M. Anazi, Khobar (SA); Naif R. Almutairi, Dammam (SA); Amani M. K. Rafie, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 351 days.

(21) Appl. No.: 18/046,099

(22) Filed: Oct. 12, 2022

(65) Prior Publication Data

US 2024/0129885 A1 Apr. 18, 2024

(51) Int. Cl.
*H04W 64/00* (2009.01)
*H04W 28/086* (2023.01)
*H04W 74/00* (2009.01)

(52) U.S. Cl.
CPC ..... *H04W 64/003* (2013.01); *H04W 28/0861* (2023.05); *H04W 74/002* (2013.01)

(58) Field of Classification Search
CPC ........... H04W 64/003; H04W 28/0861; H04W 74/002; H04W 12/033; H04W 12/088;
(Continued)

(56) References Cited

U.S. PATENT DOCUMENTS

| 7,188,180 B2 | 3/2007 | Larson et al. |
| 10,785,652 B1 * | 9/2020 | Ravindranath ....... H04W 12/48 |

(Continued)

FOREIGN PATENT DOCUMENTS

| CN | 112105074 A | 12/2020 |
| CN | 113422727 A | 9/2021 |
| WO | 2014059952 A1 | 4/2014 |

OTHER PUBLICATIONS

Maman et al.; "Beyond private 5G networks: applications, architectures, operator models and technological enablers", EURASIP Journal on Wireless Communications and Networking; No. 195; Dec. 4, 2021; pp. 1-46 (46 pages).

(Continued)

*Primary Examiner* — Mazda Sabouri
(74) *Attorney, Agent, or Firm* — Osha Bergman Watanabe & Burton LLP

(57) ABSTRACT

A system for securely transmitting data includes a data network that connects to an internet network using an internet protocol. The system also includes a user equipment (UE) that transmits a request to access enterprise data, and a base station that receives and forwards the access request to an enterprise platform. The enterprise platform includes a Multi-access Edge Computing (MEC) server that receives and forwards the access request to an enterprise server that accesses a data center storing the enterprise data. Within the enterprise platform, a first security module receives the access request from the base station, determines that an access request is secure, and forwards secure access requests to the MEC server through an encrypted connection. The MEC server transmits the processed data through the first security module to the base station and the UE, which are connected to the internet network with the first security module.

20 Claims, 4 Drawing Sheets

(58) Field of Classification Search
CPC .. H04L 65/1063; H04L 65/1069; H04L 65/80; H04L 67/141; H04L 67/52
See application file for complete search history.

(56) References Cited

U.S. PATENT DOCUMENTS

| | | | |
|---|---|---|---|
| 11,750,662 | B2 | 9/2023 | Verma et al. |
| 2017/0251368 | A1* | 8/2017 | Ross .................. H04W 4/60 |
| 2019/0124496 | A1* | 4/2019 | Ye ..................... H04L 12/66 |
| 2020/0106812 | A1 | 4/2020 | Verma et al. |
| 2021/0120408 | A1 | 4/2021 | Pazhyannur et al. |
| 2021/0243232 | A1 | 8/2021 | Verma et al. |
| 2021/0274579 | A1 | 9/2021 | Yang et al. |
| 2022/0014595 | A1 | 1/2022 | Lee et al. |
| 2022/0014951 | A1 | 1/2022 | Young et al. |
| 2022/0070636 | A1 | 3/2022 | Sabella et al. |
| 2022/0078601 | A1 | 3/2022 | Poornachandran et al. |
| 2022/0117040 | A1 | 4/2022 | Pocha et al. |
| 2022/0286428 | A1 | 9/2022 | Howe et al. |

OTHER PUBLICATIONS

Lu et al.; "Research on the Application of Uninterrupted 5G Private Network in Smart Grid", Journal of Physics: Conference Series; No. 2078; 2021; pp. 1-7 (7 pages).

Trossen et al.; "A 5G Platform for Future Interactive Media Systems", Flame, 2019; pp. 1-9 (9 pages).

J. Harmatos and M. Maliosz; "Architecture Integration of 5G Networks and Time-Sensitive Networking with Edge Computing for Smart Manufacturing", Electronics; vol. 10; No. 3085; Dec. 11, 2021; pp. 1-28 (28 pages).

First Examination Report issued in Saudi Arabian Application No. 123450527, dated Oct. 20, 2024 (9 pages).

* cited by examiner

SECURE HYBRID INTEGRATED PRIVATE 5G DEPLOYMENT ARCHITECTURE

BACKGROUND

When transmitting data over a network, security, latency, and efficiency must be balanced according to the purpose of the network and the content of the data. The network can be customized for a specific purpose by adding additional firewalls, filters, servers, sensors, and other components to the network. However, certain applications and data, such as those vital to national security, require latencies lower than that afforded by public networks, and similarly require more stringent security. In this case, an entity can opt to deploy a private network that does not connect to the internet, which affords the entity more granular control over the security, latency, and efficiency of the data transfer.

Private networks are not without their own shortcomings, however. In particular, private networks require long lead times and incur significant costs while the private network is built and operated. Furthermore, because private networks are built for specific use cases, private networks may become outdated faster than their public counterparts, or the private network may be built with lower quality components than their public counterparts. Thus, the invention presents a hybrid network architecture that combines the aspects of an internet network with those of a private network in order to provide a high level of security, robustness, and efficiency.

SUMMARY

In one or more embodiments, a system for securely transmitting data includes a data network that connects to an internet network using an internet protocol. The system also includes a user equipment (UE) that transmits a request to access enterprise data, and a base station that receives the access request from the UE and forwards the access request to an enterprise platform. The enterprise platform includes a data center with a non-transient storage medium that stores the enterprise data. In addition, the enterprise platform includes an enterprise server connected to the data center that accesses the enterprise data according to the access request and processes the enterprise data using one or more applications stored on the enterprise server. The enterprise platform further includes a Multi-access Edge Computing (MEC) server that accesses and receives the processed enterprise data from the enterprise server. Within the enterprise platform, a first security module receives the access request from the base station, determines that an access request is secure, and forwards a secure access request to the MEC server through an encrypted connection that creates a secure tunnel between the MEC server and the enterprise server. The MEC server transmits the processed data through the first security module to the base station and the UE, while the base station and the first security module are connected to the data network such that the enterprise platform and the base station are connected to the internet network.

A method for securely transmitting data includes transmitting a request to access enterprise data from a UE to a base station. The enterprise data is stored on a non-transient storage medium at a data center connected to the enterprise server. Once the base station receives the request to access the enterprise data, the base station forwards the request to a first security module, which determines if the access request is secure or unsecure. If the access request is determined to be secure, the secure access request is forwarded to an MEC server and a secure tunnel is created between the MEC server and the enterprise server. The enterprise data is accessed and processed according to the secure access request using one or more applications stored on the enterprise server. Processed enterprise data is then transmitted to the MEC server from the data center, and from the MEC server to the first security module. At one point during the process, the base station and the first security module are connected to an internet network using an internet protocol, and, thus, the data may be transmitted from the first security module to the base station and the UE, or to an internet network using the internet protocol.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Figure 1:
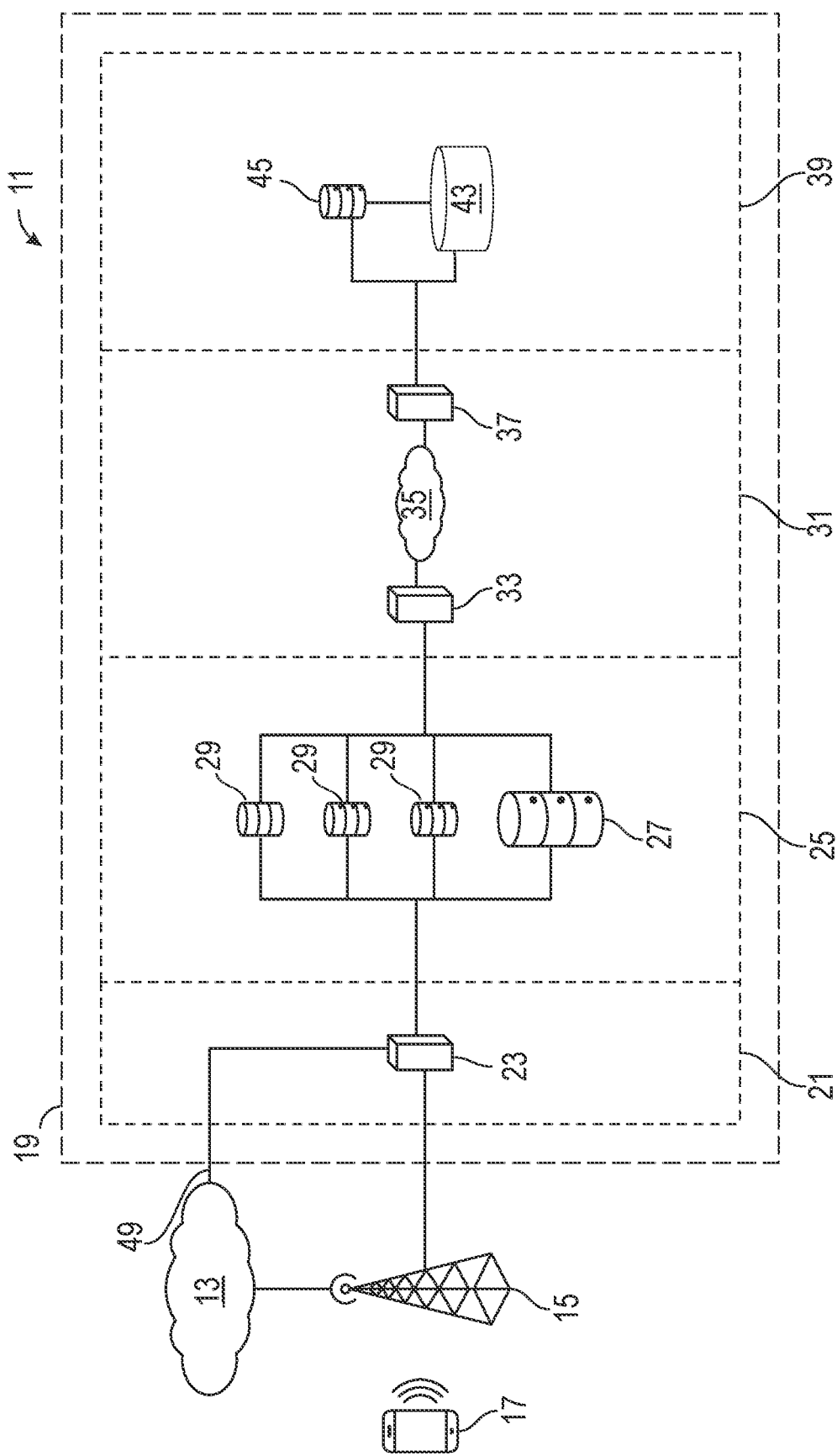
FIG. 1 depicts a hardware structure of a private network in accordance with one or more embodiments of the invention.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards a wireless network operating according to the Fifth-Generation (5G) mobile networking standards. The 5G networking standards provide high performance universal mobile technology services that cover a wide spectrum of application classes and use cases. For example, 5G networks typically offer lower latency and faster upload and download speeds when compared to a Fourth-Generation (4G) network. The faster speeds and lower latencies allow 5G networks to operate in more scenarios than a 4G network, and further enables Internet-of-Things (IoT) networks that interconnect sensors, software, and other technologies via a network connection.

Two prominent advantages of 5G are its native support for slicing and edge computing. More specifically, slicing involves segmenting the 5G network into isolated zones, or slices, that serve multiple different customers or applications. Each network slice can be individually configured, and, thus, a sliced 5G network can employ multiple network configurations within a single overarching network. In turn, this allows a network to connect multiple devices that require separate use cases and/or networking connections. For example, network slices may be configured with different bandwidths, subcarrier spacings, radio frame and subframe lengths, data and user plane functions, or other networking parameters.

On the other hand, edge computing is a particular networking structure that improves the latency and bandwidth use of a network. In particular, edge computing involves delegating processes from a centralized processor to edge servers that perform the processes. For example, edge servers may perform network routing and configuration functions, data and signal context information gathering, and/or performance monitoring that would typically be performed by a centralized processor. The centralized processor may distribute processes to the edge servers, or the edge servers may be preconfigured by a manufacturer to perform specific functions without input from the centralized processor.

Enterprises can benefit from 5G by connecting 5G capable User Equipment (UE) to the Internet via subscriber modules, which extend internet services to the UE obtained from network carriers. A wide range of enterprise applications can be securely run using these internet services by leveraging Virtual Private Network (VPN) and Mobility Management technologies. There are, however, applications that require latencies lower than what can be offered by public Internet, applications with stringent cybersecurity mandates that forbid the reliance on public networks, and applications that require customization and close monitoring that is not attainable on the public Internet. For such applications, a private networking connection is required.

As described above, an enterprise can opt to build a private 5G network to capture the aforementioned benefits. The private 5G network can be a standalone network or an extension of a corporate network. Because the private 5G network is configured as a network slice of a data network that connects to the internet, 5G network components from a carrier or a group of carriers are connected to on-premises, enterprise-managed components. The 5G network further employs a combination of security techniques that utilize carrier infrastructure while maintaining a high level of cybersecurity and privacy.

More specifically, the private 5G network employs Multiprotocol Label Switching (MPLS), which is a core network protocol that is used to create encrypted connections. The encrypted connections separate a data center of the private network from the internet services, which allows enterprise data to be securely transmitted to a UE while still retaining low latency throughput. The hybrid deployment presented herein utilizes cell towers such as base stations and antennae of the carrier to handle radio aspects of the connectivity, and utilizes the carrier's mobile core for backend networking functions such as session creation, mobility management, and subscriber authentication. Thus, the enterprise data is isolated from the internet services based upon the 5G network's slicing capability.

FIG. 1 depicts an example embodiment of a hybrid network architecture consistent with one or more embodiments of the invention as described herein. As shown in FIG. 1, a private network 11 includes a data network 13, a base station 15, a User Equipment (UE) 17, and an enterprise platform 19. The enterprise platform 19 includes a series of components that store and process data, while also determining whether the data is being securely accessed. More specifically, FIG. 1 depicts that the enterprise platform 19 is formed as a series of layers that securely access, process, and transmit enterprise data. Once a UE 17 requests access to the enterprise data, or a processed version of the enterprise data, the enterprise data is transmitted through the various layers, which verify and preserve the integrity of the enterprise data and the access request.

As shown in FIG. 1, the various layers of the enterprise platform 19 include a first security layer 21, a server layer 25, a second security layer 31, and an enterprise network 39. Within the enterprise platform 19, the various layers are interconnected using a data connection 49. The data connection 49 may be embodied as a wired connection, such as a data bus or ethernet, or a wireless connection such as Wi-Fi, Bluetooth, or Zigbee (trademarked).

With respect to the functionality of the layers, the enterprise network 39 stores enterprise data, and is further configured (as described below) to process the enterprise data through one or more applications in order to produce a processed enterprise data. On the other hand, the server layer 25 performs network configuration management, including network traffic routing, telemetry determination, performance monitoring, and session management functions to securely transmit the enterprise data from the enterprise platform 19 to the base station 15 and data network 13. Finally, the first security layer 21 and the second security layer 31 include various components that verify and enhance the security of data contained in data packets transmitted on the network.

Due to the flexible networking capabilities of 5G networks, the enterprise data represents many forms of data used by corporate and non-corporate entities alike. For example, the invention may be used as part of an automotive environment, in which case the enterprise platform 19 may be embodied as a facility that retains data for performing automated vehicle maneuvers, such as annotated video feeds that are streamed from a vehicle, which embodies the UE 17. Alternatively, the invention may be used at a secure gas or oil plant facility, where operation data is stored in the enterprise platform 19. Thus, the invention is applicable to many fields, and does not depend upon the type of data that is stored in the enterprise platform 19.

As shown in FIG. 1, the UE 17 is formed as a smartphone belonging to a user of the private network 11. When a user desires to access enterprise data stored on the enterprise platform 19 the user issues an access request to the UE 17 that, in turn, transmits the access request to a base station 15. The base station 15 is depicted in FIG. 1 as being a cell tower. However, the base station 15 may alternatively be embodied as a transmitting and receiving antenna, and is configured to route network traffic between the data network 13, the UE 17, and the enterprise platform 19. Thus, once the base station 15 receives the access request from the UE 17, the base station 15 forwards the access request to the enterprise platform 19.

In order to securely receive the access request from the base station 15, the first layer of the enterprise platform 19 is a first security layer 21 that includes a first security module 23. As described herein, the various security modules are enterprise managed security systems that verify the security and integrity of data transmitted between components. More specifically, the security module includes computer software and/or hardware, such as filters, firewalls, ports, servers, and protocols that encrypt, decrypt, authenticate, and verify the contents of the enterprise data. Thus, as shown in FIG. 1, the first security module 23 interconnects the base station 15 to a server layer 25 and verifies the integrity of the data transmitted therebetween.

By way of example, the first security module 23 is formed as a dedicated firewall that interconnects the base station 15 and the data network 13 to a server layer 25. As shown in FIG. 1, the first security module 23 is the sole connection between the enterprise platform 19, the data network 13, and the base station 15, such that all network traffic of the enterprise platform 19 must be routed through the first security module 23. This provides a heightened level of security for the enterprise platform 19, as all network traffic must be verified by the first security module 23. In addition, the base station 15 is connected to the data network 13 with a control channel, while the data network 13 is connected to the first security module 23 with a backhaul connection that connects the first security module 23 to a core of the data network 13.

As is commonly known in the art and as described herein, firewalls operate according to a variety of methods to verify the security of the network traffic. By way of example, a firewall can employ packet filtering, where the firewall compares the Internet Protocol (IP) address of data packets transmitted by the base station 15, the UE 17, and the data network 13 to a list of allowed IP addresses, and only allows data packets with verified IP addresses to be transmitted on the private network 11. Alternatively, or additionally, the firewall may include a circuit level gateway, in which the firewall monitors network configuration messages (which are used to add, remove, or change the connection status of a device within the data network 13) to determine if a networking session is valid by comparing the proposed configuration to a preconfigured set of valid configurations. Similarly, the firewall may employ application level gateways, in which data packets are filtered according to the data contained therein, which may be enterprise data or a request for enterprise data as discussed above.

While the aforementioned methods are useful for quickly verifying the integrity of the network traffic according to a single piece of information, a firewall can also operate by verifying the integrity of multiple parts of a data packet. For example, the firewall may employ a stateful inspection or dynamic packet filtering method that verifies the contextual information (e.g. data headers, Transmission Control Protocol (TCP) streams, User Datagram Protocol (UDP) messages, Internet Control Message Protocol (ICMP) messages etc.) of the data packet as well as the information contained therein. As another example, the firewall may be embodied as a Next-Generation Firewall (NGFW), which combines the features of packet filtering, context monitoring, state monitoring, and/or Deep Packet Inspection (DPI) filtering in a single firewall.

In addition to performing packet and data verification, a firewall can perform packet encryption, such that the data is securely transmitted through the network. As described herein, the various firewalls use Internet Protocol Security (IPsec) as a communication suite. As is commonly known in the art, IPsec proves key authentication, where data packets are encrypted with a "key," or string of random characters, that is exchanged between devices and is subsequently used to decrypt received data packets. During this process, the first security module 23 forms a security association between the base station 15 and components of the server layer 25, and transmits cryptographic keys that allow the base station 15 and server layer 25 to encrypt and decrypt data packets transmitted therebetween. The header of the data packet may be encrypted with an authentication header, which encrypts a cryptographic hash of the packet's contents in data packet's header. Further, the data of the packet itself may be encrypted according to a payload encryption process, and the data may be decrypted by either the base station 15 or components of the server layer 25 by using the authentication key.

As described herein, the first security module 23 performs the functions of a next generation firewall such that the first security module 23 performs packet filtering, context monitoring, state monitoring, and DPI on data packets transmitted between the base station 15 and a server layer 25. As shown in FIG. 1, the server layer 25 is formed of a management server 27 and a series of Multi-Access Edge Computing (MEC) servers 29 that perform processes that service the base station 15, the data network 13, and the enterprise network 39.

In general, the various servers as described herein contain software and/or hardware that perform processes or services on a client oriented basis, such that the management server 27 and MEC servers 29 respond to requests from the data network 13, the base station 15, and the enterprise network 39. By way of example, the hardware that makes up the MEC servers 29 may include, but is not limited to, a processor, microprocessor, memory, a Human Machine Interface (HMI), a power supply, a transmitter, a receiver, and/or equivalents thereof. Similarly, the software portion of the MEC servers 29 may include applications and programs that contain instructions for processing data, which may be written in computer programming languages such as Java, C++, or equivalent languages known to a person of ordinary skill in the art. The term MEC servers as used herein may refer to a single device or a plurality of devices, and/or programs, applications, processes, and functions stored thereon.

Processes and services that are requested of the server layer 25 include gathering telemetry, performance, and context information from the data network 13, the base station 15, the UE 17, and the enterprise platform 19. Specifically, the server layer 25 requests telemetry data from each of the physical components of the private network 11, and the components respond by transmitting GPS coordinates derived from GPS transmitters (e.g., FIG. 2) located on board the components. Alternatively, the server layer 25 may monitor the strength of a signal transmitted from a component by comparing the received strength of a signal to the transmitted strength of the signal. Subsequently, the server layer 25 calculates the telemetry data by contrasting the signals' degradation with the medium that the signal is transmitted through.

Through the use of the telemetry data gathered by the server layer 25, the first security layer 21 is capable of restricting access of the enterprise platform 19 only to devices that are in the same physical location as components of the enterprise network 39. For example, if a UE 17 attempts to connect to the private network 11, the MEC servers 29 will collect telemetry data from the UE 17 prior to communicating with the enterprise network 39, and compare GPS coordinates of the telemetry data to a list of approved coordinates. If the GPS coordinates of the telemetry data fall within the list of approved coordinates, the MEC servers 29 will continue to establish communication with the enterprise network 39. However, if the MEC servers 29 don't recognize the GPS coordinates, the MEC servers 29 will direct the first security layer 21 to refuse to transmit data to the UE 17, and the connection between the enterprise platform 19 and the UE 17 is severed. Similarly, the MEC servers 29 may be configured to refuse access to the UE 17 if the UE 17 transmits a signal with a strength below a predetermined threshold, in which case the MEC servers 29 assumes that the UE 17 is not physically located near the enterprise platform 19.

In addition to capturing telemetry data using the MEC servers 29, the server layer 25 also includes a management server 27 that performs session management, performance monitoring, and security logging. Specifically, session management performed by the management server 27 includes registering (or attaching) and unregistering (or removing) a UE 17 on the private network 11, providing communication policy associations to the UE 17, and performing Access and Mobility Management Function (AMF) using Non-Access Stratum (NAS) messaging. In addition, the management server 27 conducts performance monitoring by tracking the latency, packet drop rate, resource usage, and signal strength of the data network 13, the base station 15, and the UE 17.

The management server 27 performs security logging by, among other things, tracking the IP addresses and access credentials such as usernames and passwords transmitted by the UE 17 and/or the base station 15, recording the content and access time of the enterprise data, and logging the telemetry data of the various components that access the enterprise data. The security logs are transmitted to a Security Event and Incident Management (SIEM) portion (not shown) of the management server 27 or enterprise server 45, which analyzes the security logs and determines if a security threat is present.

Returning to FIG. 1, once the request to access the enterprise data has been processed by the server layer 25, the request is transmitted through a second security layer 31 to the enterprise network 39. Initially, requests to access data that are transmitted to the server layer 25 are processed through a second security module 33. During operation, the second security module 33 verifies the context and/or contents of the data packets transmitted to and from the MEC servers 29 and the management server 27, and discards data that does not match preconfigured conditions, in which case the MEC servers 29 determine that the access request was unsecure. In addition, and as shown in FIG. 1, requests to access the enterprise data must be forwarded through the server layer 25. Thus, the second security module 33 is further configured to filter out access requests that are not transmitted by IP addresses of the management server 27 and MEC servers 29, which are unsecure access requests. Such is beneficial in cases where an unwanted entity attempts to access the enterprise data through the server layer 25, as all traffic to the enterprise network 39 must be processed through the second security module 33.

In addition to the second security module 33, the second security layer 31 also includes an encrypted connection 35, which forms a dedicated overlay that isolates the second security module 33 from a third security module 37. In the embodiment shown in FIG. 1, the encrypted connection 35 is configured as dedicated hardware and/or software that encrypts and decrypts data transmitted therethrough. Initially, the encrypted connection 35 performs a key handshake, where the encrypted connection 35 provides an encryption key to the enterprise network 39 and the server layer 25. Subsequently, during operation, the encrypted connection 35 then encrypts the data according to an encryption algorithm, and transmits the encrypted data to the enterprise network 39 through the third security module 37. Thus, once configured, the encrypted connection 35 creates a secure tunnel from the server layer 25 to the enterprise network 39 that ensures that the access requests and enterprise data are encrypted during use. The encrypted connection 35 may alternatively be embodied as a Virtual Routing and Forwarding (VRF) connection, where the MEC servers 29 use routing tables to forward data from the second security module 33 to the third security module 37. Furthermore, the encrypted connection 35 may be embodied as a Virtual Local Area Network (VLAN), where a broadcast domain is partitioned to isolate traffic to a specific group of devices or components at a data link layer (not shown). Finally, the encrypted connection 35 may be embodied as a Virtual Private Network (VPN), which forms an encrypted tunnel to transmit data therethrough.

As an encryption method, the encrypted connection 35 can employ symmetric encryption, where the same encryption key is used by both the server layer 25 and enterprise network 39. In addition, the encrypted connection 35 may use asymmetric encryption, where a public key is used to encrypt the information, while a private key is used to decrypt the information. Alternatively, the encrypted connection 35 may use a combination of both symmetric and asymmetric encryption, such as Advanced Encryption Standard (AES), Temporary Key Integrity Protocol (TKIP), Wired Equivalent Privacy (WEP), or equivalent.

After being encrypted by the encrypted connection 35, the access request is transmitted to a third security module 37, which verifies the integrity of access requests prior to accessing the enterprise network 39. Specifically, the third security module 37 verifies that the context and content of the access request has not been damaged in the encryption process. Such may be performed by verifying that an access request has a certain length before and after encryption to ensure that data has not been added or removed, and by verifying that the IP address of the transmitting component matches an approved list of addresses. Once the third security module 37 has verified the integrity of the access request, the access request is transmitted to the enterprise network 39, where the enterprise data is accessed and processed.

From a physical standpoint, the second security layer 31 may be implemented in a variety of configurations. As a first configuration and as shown in FIG. 1, the second security module 33, the encrypted connection 35, and the third security module 37 are each configured as physical devices that are interconnected with a data connection. In this case, the second security module 33, encrypted connection 35, and third security module 37 are each equipped with computing components such as transmitters, receivers, processors, non-transient storage mediums, and power supplies (not shown). Alternatively, the second security module 33, encrypted connection 35, and third security module 37 may be software, and may not include any physical components. In such cases, the second security module 33 may be embodied as software stored in components of the server layer 25, while the third security module 37 is similarly embodied as software stored in the enterprise network 39 and the encrypted connection 35 is embodied in software stored in both the server layer 25 and the enterprise network 39. Finally, the second security layer 31 may be embodied as a combination of both software and hardware according to the above examples.

After being processed by the second security layer 31, the access request is forwarded to the enterprise network 39, where the enterprise data is accessed. As shown in FIG. 1, the enterprise network 39 includes a data center 43 and an enterprise server 45, which are interconnect with a data connection 49. With respect to the functionality thereof, the data center 43 is a non-transient storage medium that stores the enterprise data. Thus, the data center 43 may be embodied as flash memory, a Hard Disk Drive (HDD), a Solid State Drive (SSD), or equivalent.

On the other hand, the enterprise server 45 performs the duties of processing the enterprise data and facilitating the connection to the second security layer 31. That is, the enterprise server 45 includes a processor, memory, interface, and a transceiver that are configured to collectively transmit and receive radio frequency signals from the second security layer 31, as well as all control plane functions necessary to connect the enterprise server 45 to the second security layer 31. Additionally, the components of the enterprise server 45 process the enterprise data according to the access request, which creates the processed data as described below. Thus, the enterprise server 45 performs the functions of both an application server, which gathers user input, and a backend server, which processes the data. However, the enterprise server 45 may only perform backend server duties and instead offload the application server functions to the MEC servers 29, in which case the MEC servers 29 stores functions to collect, process, and transmit instructions for processing the enterprise data.

As the enterprise data may take many different forms according to the specific use case of the enterprise network 39 as a whole, the exact methods and processes used by the enterprise server 45 to process the data varies according to the enterprise data. For example, if the enterprise network 39 is part of an oil and gas drilling facility, the enterprise data stored on the data center 43 may include topological data concerning a wellbore, such as thermal images, acoustic imaging data, or ultrasonic imaging data. In this case, the enterprise server 45 can perform feature extraction, which identifies and labels regions of interest on the imaging data, and transmit the extracted feature locations to the UE 17 as the processed data. As another example, the enterprise network 39 may be part of an automotive insurance risk determination unit, in which case the enterprise data is raw data concerning a driver's actions, and the enterprise server 45 processes the raw data to determine the potential for a vehicular collision to occur for the driver. Such examples are nonlimiting, and are included solely to provide background for potential use cases of the invention.

Once the enterprise data is processed by the enterprise server 45, the processed data is transmitted through the second security layer 31, the server layer 25, and the first security layer 21 to the base station 15. During this process, the various security modules verify the integrity and destination of the processed enterprise data. Specifically, each of the security modules compare the processed data to a series of predetermined conditions, and discards processed data that does not meet the conditions. Such predetermined conditions are determined according to the nature of the enterprise network 39, and may include restrictions on the size, file format, or amount of processed enterprise data transmitted, restrictions on the content of data transmitted, and/or IP address restrictions of components that receive the processed data. In addition, each of the security modules may assign and/or monitor hash values, cryptographic hash values, and/or checksums of the processed enterprise data to ensure that the processed data has not been modified. Finally, during this process, the processed data is encrypted and tunneled through the encrypted connection 35 such that the processed data is securely transmitted between the second security module 33 and third security module 37.

After the processed data has successfully been processed through the security modules to the base station 15, the base station 15 transmits the processed data to the UE 17, which completes the data access procedure. Alternatively, or additionally, the processed data may be transmitted from the first security module 23 to the data network 13, where the data may be accessed by any device using an internet protocol as described above.

Figure 2:
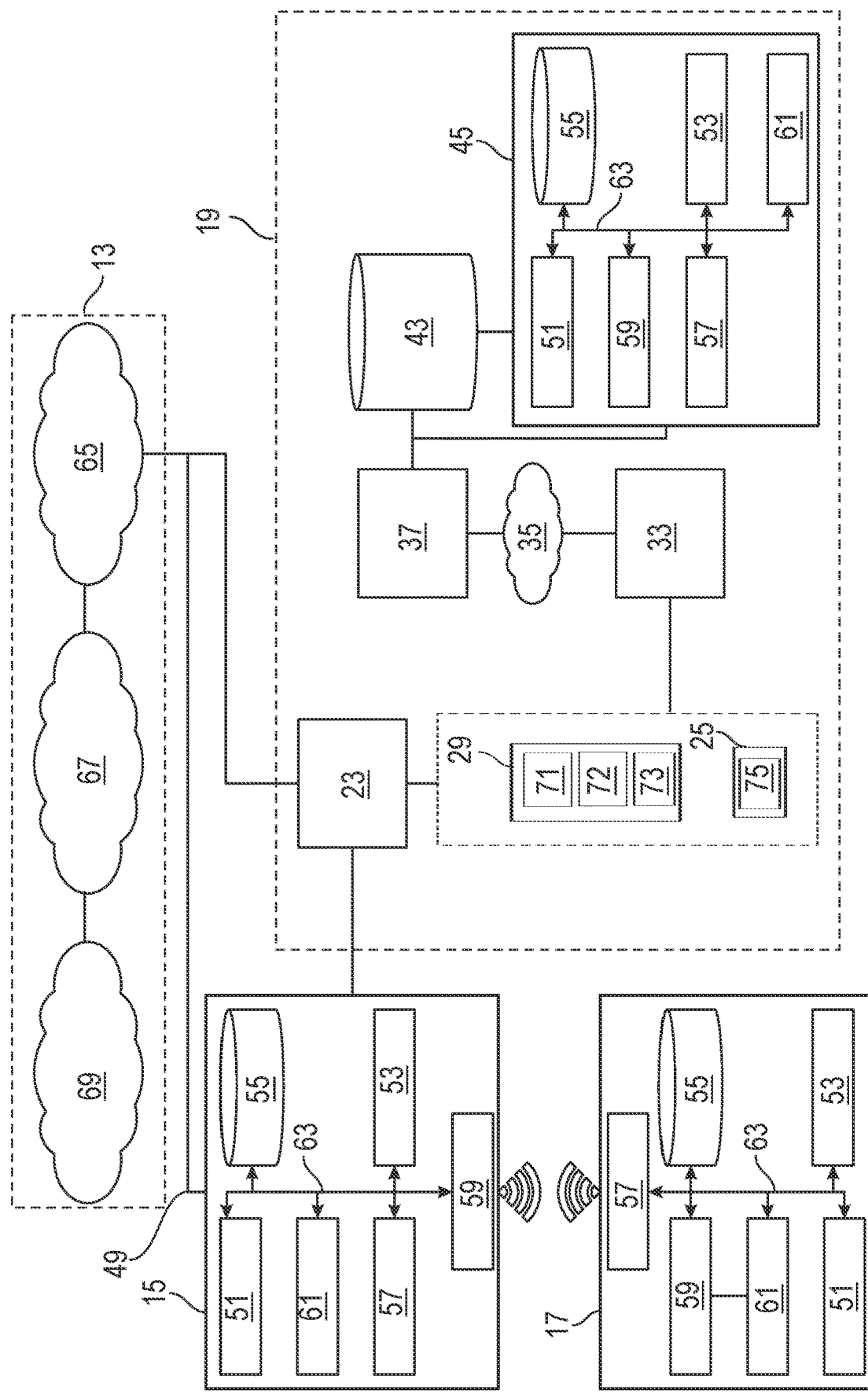
FIG. 2 depicts a system overview of a private network in accordance with one or more embodiments of the invention.

FIG. 2 depicts a block diagram of a private network 11 according to one or more embodiments of the invention. As shown in FIG. 2, a UE 17 includes a Human Machine Interface (HMI) 51 that receives user input, where the user's input is a request to access the enterprise data. By way of example, the HMI 51 includes a display (not shown), as well as a way to interact with the display such as a touchscreen, stylus, keyboard, mouse, a combination thereof, or equivalent. In order to request access to the enterprise data, and request that certain processes be performed by the enterprise network 39, the HMI 51 displays application specific prompts or input fields that the user interacts with. Alternatively, the HMI 51 may display a Graphic User Interface (GUI) that the user interacts with to access applications stored on the enterprise network 39, or may display a series of operations or processes that the enterprise network 39 can perform on the enterprise data. Regardless of the interface utilized by the private network 11, the input (and corresponding actions and processes) captured by the HMI 51 forms the request to access the enterprise data, which is subsequently transmitted through the enterprise platform 19.

In order to interpret the user's input, the UE 17 includes a processor 53 and a memory 55 that store and utilize applications, programs, and/or processes that transform the user's input into a request to access enterprise data. More specifically, the processor 53 correlates the user's input to portions of the GUI that correspond to specific applications, data, or processes stored on the enterprise platform 19. Based upon the correlation with the GUI, the processor 53 transmits signals to the base station 15 requesting access to the corresponding enterprise data, which is processed through the enterprise platform 19 as described above. Because the GUI, processes, and applications for processing the enterprise data are stored on the enterprise platform 19, the UE 17 includes applications that display a virtual mirror of the GUI and its associated functions, which allows the user to utilize the applications of the UE 17 from any location.

In addition to an HMI 51, the processor 53, and the memory 55, the UE 17 further includes a receiver 59 and a transmitter 57. As described herein, the receiver 59 and the transmitter 57 are formed as one or more circuits, coils of wire, antennas, or data ports that respectively gather and send radiofrequency signals to and from the base station 15 and/or data network 13. In addition, radiofrequency signals as described herein are transmitted on cellular frequency bands, and have a frequency as low as 400 Megahertz (MHz) and as high as 71 Gigahertz (GHz). Furthermore, the radio signals that are transmitted and received may be uplink or downlink signals, and may be modulated, amplified, punctured, and/or encrypted without departing from the nature of this specification. In relation to the private network 11, the transmitter 57 transmits the request to access the enterprise data, while the receiver 59 receives the enterprise data from the base station 15.

To provide the UE 17 with the capability to collect telemetry data, the UE 17 includes a Global Positioning System (GPS) unit 61. The GPS unit 61 connects to a GPS satellite system (not shown), and receives information concerning the amount of time it takes to transmit a signal between a GPS satellite and the UE 17, as well as information concerning the exact location of the satellite. Based upon the amount of time required for signal transmission, as well as the location of the satellite, the GPS unit 61 uses triangulation or hyperbolic positioning to determine the location of the UE 17. Subsequently, the GPS unit 61 transmits GPS coordinates of the location of the UE 17 to the processor 53, which are later transmitted to the enterprise platform 19 as the telemetry data of the UE 17.

As shown in FIG. 2, components of the UE 17 are interconnected using a bus 63. More specifically, the bus 63 is a data bus formed of hardware such as wire, optical fiber, pins, and sockets that connect to each of the HMI 51, the processor 53, the memory 55, the receiver 59, the transmitter 57, and the GPS unit 61. During operation, the bus 63 allows the receiver 59 and transmitter 57 to transmit the aforementioned radio signals to and from the processor 53 and the memory 55. Thus, the bus 63 is similar to the data connection 49, as both the bus 63 and the data connection 49 serve to interconnect the various components of the private network 11.

With respect to the base station 15, and as shown in FIG. 2, the constituent components thereof are substantially similar to the UE 17. Thus, the base station 15 includes a human machine interface 51 that receives user input, which allows the base station 15 to be configured by a manufacturer. In addition, the HMI 51 of the base station 15 allows network diagnostic information to be viewed and collected by a user, such as the number of UEs 17 connected to the base station 15 or networking resources utilized within the private network 11. Accordingly, the HMI 51 of the base station 15 differs in functionality from the HMI 51 of the UE 17, as the HMI 51 of the base station 15 is configured to receive inputs for monitoring network performance and configurations, while the HMI 51 of the UE 17 is used to gather the request to access the enterprise data. Furthermore, the HMI 51 of the base station 15 may be a data port, such as a Universal Serial Bus (USB) port or Ethernet port, or an input mechanism such as a keyboard and/or mouse, as described above.

In addition to the HMI 51, the base station 15 also includes a transmitter 57 and a receiver 59 that respectively send and accept radiofrequency signals as described above. To service a private network 11 including multiple UEs, the base station 15 may include a plurality of transmitters 57 and receivers 59. Alternatively, or additionally, the coils that form the transmitter 57 and receiver 59 may be larger than those of a UE 17. Furthermore, the base station 15 includes a processor 53 and memory 55, which perform network related processes such as resource management, access logging, and forwarding data to the enterprise platform 19. The processor 53 and memory 55 further communicate with a GPS unit 61 of the base station 15 if the base station 15 is not stationary, such that the processor 53 can send telemetry data of the base station 15 to the enterprise platform 19. Finally, as shown in FIG. 2, the components of the base station 15 are connected via a bus 63, which is formed as wires or circuits that interconnect the various components of the base station 15.

Continuing with FIG. 2, the base station 15 is connected to a data network 13, which connects to an internet network 69 using an internet networking protocol such as Internet Protocol version 4 (IPv4) or equivalent. In order to connect to the internet network 69, the data network 13 includes a network core 65, which is embodied as one or more routers, servers, and switches. The network core 65 provides features such as carrier aggregation, data forwarding, authentication management, session management, policy control, location management, network slice selection, and service invocation. In addition, the network core 65 is connected to the internet network 69 via a service provider backbone 67, which is formed by a series of high speed data transmission lines, such as fiber optic cables, that provide a physical infrastructure to connect to the internet network 69.

The data network 13 is also coupled, via a data connection 49, to the enterprise platform 19 as described above. Specifically, the enterprise platform 19 includes a dedicated receiver (not shown) located in either the first security layer 21 or server layer 25 that receives the access request transmitted by the base station 15. As such, users are able to access the enterprise platform 19 via an internet connection. However, the enterprise platform 19 restricts access to UEs 17 that are physically located on the enterprise's premises as described above. Consequently, users are able to access the enterprise data from a comfortable location such as an office located at the enterprise using an internet connection, and do not need to physically interact with a data center itself.

As shown in FIG. 2 and as described above, the enterprise platform 19 includes a server layer 25 that connects the enterprise platform 19 to the data network 13 through a first security module 23. The server layer 25 includes Multi-Access Edge Computing (MEC) servers 29 that perform edge computing services, and a management server 27 that performs data logging 75. In particular, the MEC servers 29 perform User Plane Functions 71 (UPF), application server functions 72, and Management Plane (M-Plane) functions 73, while the management server 27 performs data logging 75 in the form of security logging, performance monitoring, and telemetry gathering functions. Although not shown, the MEC servers 29 may be configured to perform other network functions such as Policy Control Functions (PCF), Authentication Server Functions (AUSF), Network Slice Selection Function (NSSF), or equivalent.

As is commonly known in the art, UPFs provide anchor points between a radio network and a UPF, between two UPFs, and between an M-plane function and a UPF. The anchor points provide locations to encapsulate and decapsulate data for a tunneling protocol, which may be a Point-to-Point Tunneling Protocol (PPTP), a Secure Socket Tunneling Protocol (SSTP), a Layer 2 Tunneling Protocol (L2TP), or equivalent. Additional UPF functionalities include packet routing and forwarding, rule enforcement, traffic reporting, packet inspection, and Quality of Service (QoS) handling. On the other hand, the M-plane performs management operations for the enterprise platform 19. Specifically, the M-plane performs network slice session management, IP address allocation, Dynamic Host Configuration Protocol (DHCP) functions, Non-Access Stratum (NAS) signaling and ciphering, UE authentication, and traffic routing features. Similarly, application server functions 72 form a user interface for a user to interact with in order to access data stored in the data center 43 and the enterprise server 45. In this case, the application and backend functions are divided between the MEC servers 29 and the enterprise server 45. That is, when the MEC servers 29 performs application server functions 72, the enterprise server 45 functions as a backend server such that the enterprise server 45 accesses data stored on the data center 43 and performs functions according to instructions from the MEC servers 29 including the application server functions 72. In such cases, the application server functions 72 may include computer code representative of an Application Programming Interface (API) and/or Graphical User Interface (GUI) that the user may interact with in order to access data stored on the data center 43 through the enterprise server 45.

By offloading the UPF functions 71 and M-plane functions 73 to the MEC servers 29, the enterprise platform 19 operates according to Ultra-Reliable Low Latency Communications (URLLC) requirements, which requires 99.999% packet reliability and a latency less than 1 millisecond. Additionally, the enterprise platform 19 is configured to perform grant-free communication when transmitting the access data, which further reduces the latency of the enterprise platform 19.

Continuing with FIG. 2, the server layer 25 is coupled to a data center 43 and an enterprise server 45 via a second security module 33, a third security module 37, and an encrypted connection 35, which create a secure connection between the MEC servers 29 and the data center 43 and enterprise server 45. As shown in FIG. 2, the enterprise server 45 includes a processor 53, a memory 55, a transmitter 57, and a receiver 59. With respect to the functionality thereof, the processor 53 executes applications or programs that are stored on the memory 55 for processing the application data. The transmitter 57 and receiver 59 send and receive data, including receiving the enterprise data from the data center 43. Finally, components of the enterprise server 45 are communicably coupled via the bus 63, which is embodied as cables or wires as described above.

Once the enterprise data is processed by the enterprise server 45, the enterprise data is transmitted back to the base station 15 and UE 17 via the first security module 23, the server layer 25, the second security module 33, the encrypted connection 35, and the third security module 37 as described above. Transmitting the processed enterprise data to the base station 15 and UE 17 completes the data access procedure, at which point the user may initiate the process by requesting access to a different subset of the processed enterprise data.

Figure 3:
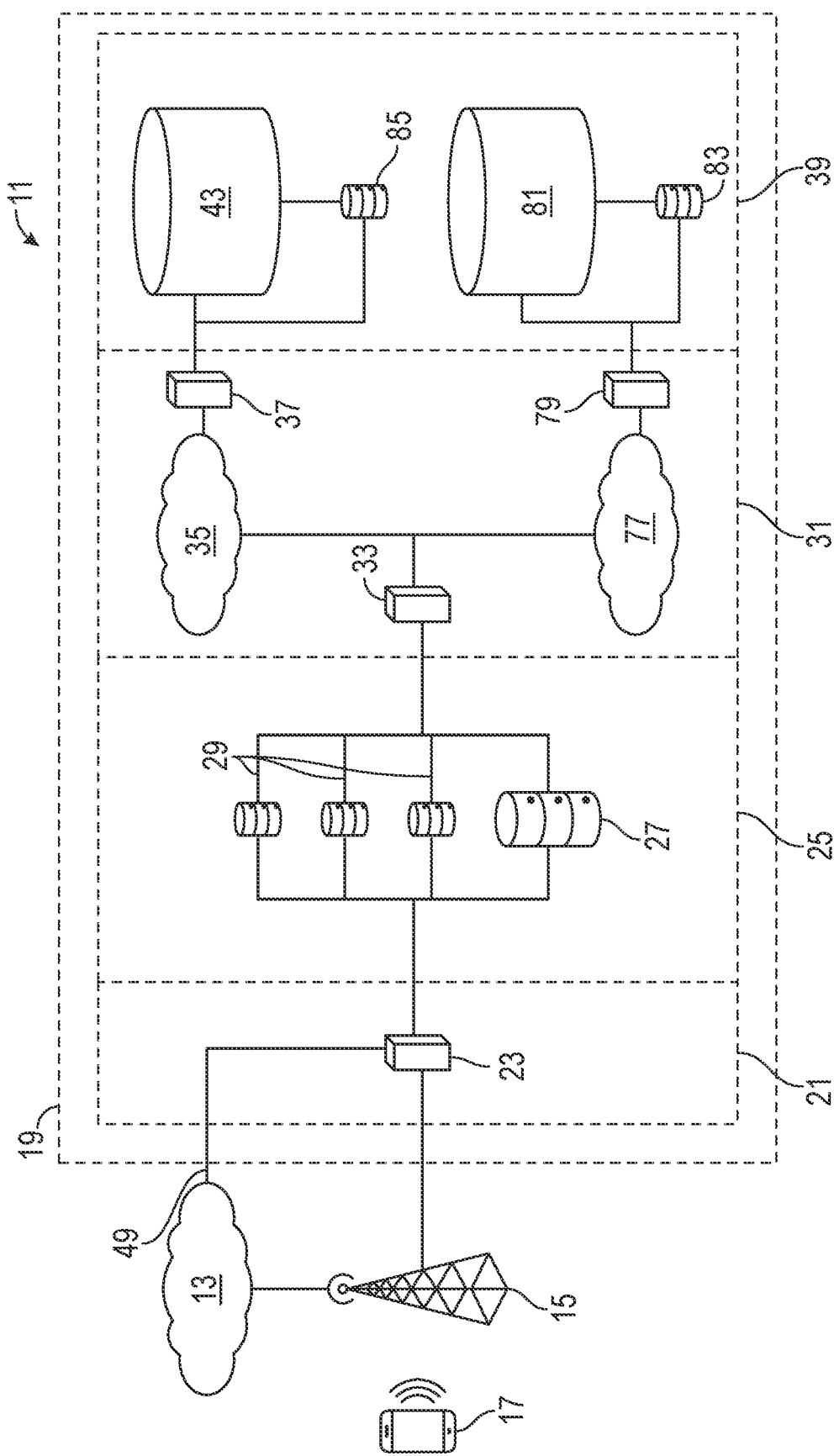
FIG. 3 depicts a hardware structure of a second private network in accordance with one or more embodiments of the invention.

FIG. 3 depicts an alternative embodiment of the invention where an enterprise platform 19 includes multiple data centers and backend data servers. Such an embodiment reflects a situation where an enterprise has multiple work processing stations that perform separate functions. By way of example, and consistent with the aforementioned examples of oil and gas enterprises, the first data center 43 may be a station for processing imaging data of a wellbore, while the second data center 81 is a separate station for analyzing drilling mud samples taken from the wellbore. This arrangement allows the enterprise network 39 to be formed as a network of multiple devices, data centers, and backend servers, which increases the utility and/or efficiency of the enterprise network 39.

As shown in FIG. 3, the enterprise network 39 includes a first data center 43 and a first backend server 85, as well as a second data center 81 and a second backend server 83. In order to accommodate both the first backend server 85 and the second backend server 83 within the enterprise platform 19, a second security layer 31 of the enterprise platform 19 is equipped with a second encrypted connection 77 and a fourth security module 79, which connect to the second data center 81 and second backend server 83. Due to the separate encrypted connections, the enterprise platform 19 has an enhanced level of security, as enterprise data from the first data center 43 and the second data center 81 must be separately encrypted and tunneled through the first encrypted connection 35 and the second encrypted connection 77, respectively, before being coalesced at the second security module 33 and/or MEC servers 29.

In order to provide a cohesive interface, in the embodiment depicted in FIG. 3 the MEC servers 29 perform application server functions 72 as described above. Thus, the first backend server 85 and the second backend server 83 perform backend server functions, which include accessing and processing the data according to instructions generated by the MEC servers 29 from a user's input to the UE 17. Such an arrangement advantageously allows the MEC servers 29 to manage the first data center 43 and second data center 81 at the same time due to being interconnected therewith. At the same time, because the first backend server 85 is separate from the second backend server 83, a heightened level of security is achieved where a user cannot access data on the second data center 81 via the first backend server 85 and first data center 43.

Moreover, the separation of the application server functions 72 from the enterprise network 39 allows the second security module 33, the third security module 37, and the fourth security module 79 to perform different functions according to which data center the enterprise data is coming from. More specifically, because the third security module 37 and fourth security module 79 may process different sizes and formats of data, the type of filtering employed by the third security module 37 and the fourth security module 79 will differ as well. The type of filtering may be determined by an operator or manufacturer, or may be adjusted by components of a server layer 25 of the enterprise platform 19. In addition, the second security module 33 is configured to verify data originating from both the first backend server 85 and the second backend server 83, and, thus, may include functions to analyze pieces of data with different tunneling protocols. The second security module 33, the third security module 37, and the fourth security module 79 are each embodied as firewalls, and may perform the same or different functions according to the use case of the enterprise data.

Similarly, the first encrypted connection 35 and the second encrypted connection 77 may use different tunneling protocols to enhance the security of the enterprise platform 19, or use the same tunneling protocols so that the tunneling protocols can be configured by a single command. Alternatively, the first encrypted connection 35 and second encrypted connection 77 may be interchanged, either individually or collectively, for a VRF connection or a VLAN as described above. The types of connections used, as well as the types of filtering used by the various security modules, are configured by the MEC servers 29 in order to offload processing from the enterprise network 39.

Figure 4:
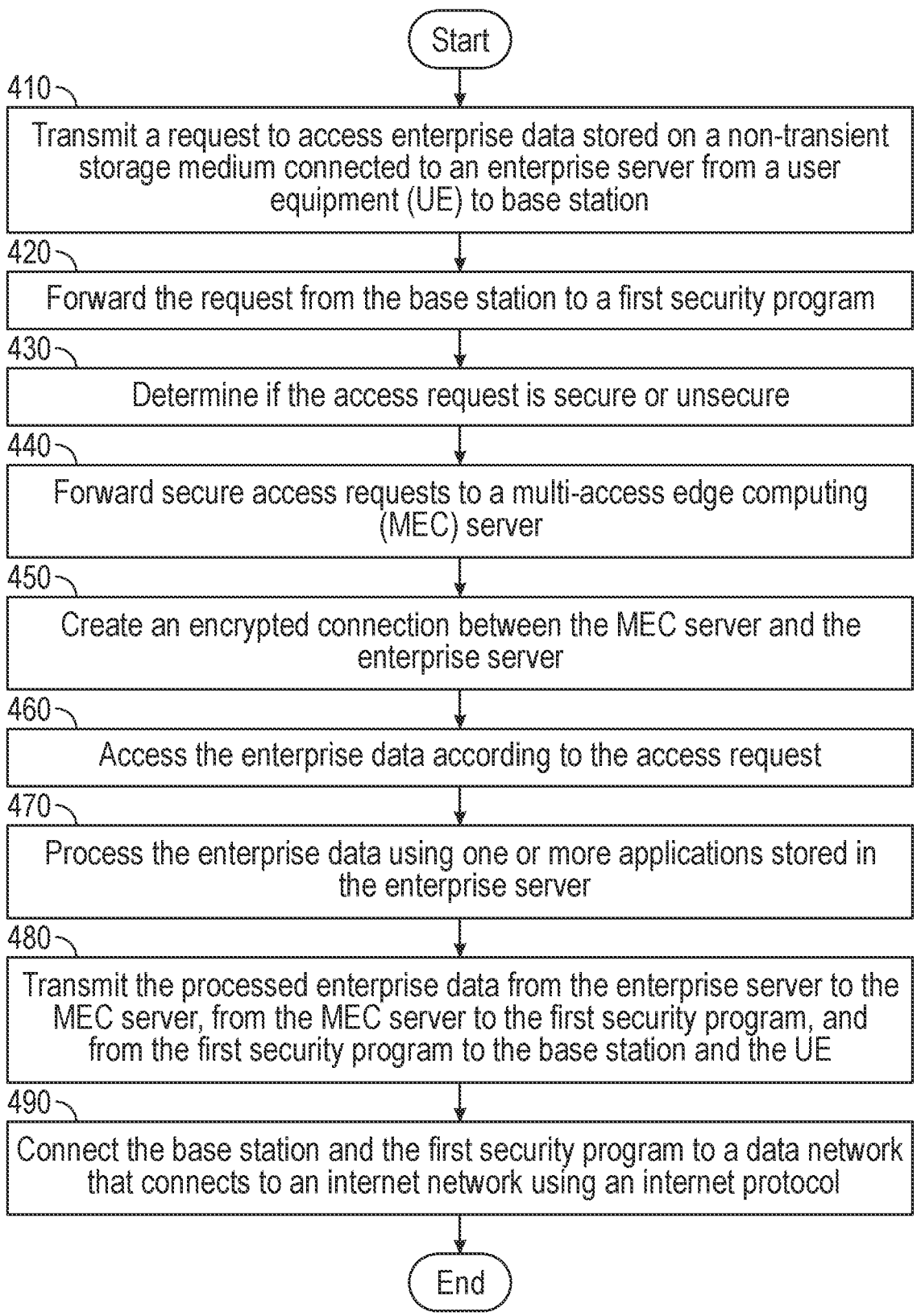
FIG. 4 depicts a flowchart of a method in accordance with one or more embodiments of the present disclosure.

FIG. 4 depicts a method of securely transmitting data to and from an enterprise platform. Steps of FIG. 4 may be performed, for example, by the aforementioned components of the private network 11, but is not limited thereto. The method initiates with step 410, where a request to access enterprise data is transmitted. Specifically, a Human Machine Interface (HMI) 51 of a User Equipment (UE) 17 displays information to a user that the user interacts with, where said interaction forms the access request. The information displayed to a user may be an icon or series of icons that correspond to enterprise data that the user would like to access. Alternatively, the information may be embodied as an input field where a user may input a file path of the desired enterprise data, which is stored on a non-transient storage medium that is connected to an enterprise server 45 that processes the enterprise data. Thus, when the user interacts with the HMI 51, the HMI 51 captures the user's input and transmits a request to access the data corresponding to the user's input to a base station 15, at which point the method proceeds to step 420.

In step 420, the access request is forwarded from the base station 15 to a first security module 23 stored on the enterprise platform 19. To do such, the base station 15 is equipped with a transmitter, which may be a dedicated circuit or coil of wires, that oscillates at a specific frequency to create a radiofrequency signal. The radiofrequency signal is transmitted to the enterprise platform 19, which is received by a receiver of the first security module 23, or, if the first security module 23 is purely software, a receiver of the server layer 25 that digitizes the signals and transmits the signals to the first security module 23. Once the access request is received by the first security module 23, the method proceeds to step 430.

In step 430, the security of the access request is verified by the first security module 23. Specifically, the first security module 23 performs firewall functions, such as packet filtering, configuration monitoring, and/or application level gateway filtering to ensure that the access request is secure. If any of the components of the access request, such as the size, format, and/or hash of the access request does not match a list of preconfigured conditions, the first security module 23 discards the access request. If the access request is deemed secure by the first security module 23, the method proceeds to step 440.

In step 440, secure access requests are forwarded to a series of Multi-access Edge Computing (MEC) servers 29. The MEC servers 29 perform edge computing services for the enterprise platform 19, which are services offloaded from the enterprise server 45 to the MEC servers 29. In addition, the MEC servers 29 perform User Plane Functions (UPF) 71 and Management Plane (M-plane) functions 73, which perform functions such as data routing, network configuration, and resource management, among other things. Finally, the MEC servers perform application server functions, such as gathering user input and directing backend server(s) of the enterprise network 39 to process the enterprise data.

Once the access request is received by the MEC servers 29, the method proceeds to step 450, where an encrypted connection is created between MEC servers 29 and the enterprise server 45. In this step, an encrypted connection 35 is created between a second security module 33 and a third security module 37, which form encryption anchor points for encrypting and decrypting the access request. As the server layer 25, including the MEC servers 29, is connected to the second security module 33, and the third security module 37 is coupled to the enterprise server 45, the encrypted connection 35 is the sole data route between the MEC servers 29 and the enterprise server 45. Thus, the MEC servers 29 transmits the access request to the second security module 33, at which point the encrypted connection 35 encrypts the access request and transmits the encrypted access request. The access request is then decrypted by the encrypted connection 35 at the third security module 37, which proceeds to transmit the request to the enterprise server 45. As described above, the second security module 33, third security module 37, and fourth security module 79 may be hardware, software, or a combination thereof, and perform firewall functions such as packet filtering on the enterprise data.

In step 460, the enterprise data is accessed by the enterprise server 45 according to the access request. In this step, the enterprise server 45 receives the access request, and determines whether the enterprise data must be processed according to the access request. Regardless of whether the enterprise data must be processed, the enterprise server 45 accesses a data center 43 that contains the enterprise data, which includes transmitting a message requesting access to the data, and receiving the enterprise data from the data center 43. The data center 43 and the enterprise server 45 are interconnected with a data connection 49, which may be a wired or wireless connection as described above. Once received, the enterprise server 45 processes the enterprise data in step 470.

In step 470, the enterprise data is processed by the enterprise server 45. As described above, the step of processing enterprise data is case specific, and depends on the type of enterprise data being processed. For example, in an autonomous driving environment, the enterprise data is formed by raw video footage from the vehicles, which is annotated by the enterprise server 45 as the processing step. Regardless of the type of processing that occurs, a processor 53 of the enterprise server 45 performs the processing, which is transmitted by a transmitter 57 of the enterprise server 45 in step 480.

Specifically, in step 480, the processed enterprise data is transmitted from the enterprise server 45 back to the UE 17. During this process, the processed enterprise data is transmitted from the enterprise server 45 to the MEC servers 29 through the encrypted connection 35, and from the MEC servers 29 to the first security module 23. From the first security module 23, the processed enterprise data is transmitted to the base station 15 using the aforementioned transmitters and receivers of the enterprise platform 19 and base station 15.

In step 490, the base station 15 and the first security module 23 are connected to an internet network. Specifically, the first security module 23 is coupled to a data network 13 containing a network core 65 that connects to an internet network 69 via a service provider backbone 67. Thus, the processed enterprise data can be transmitted to the UE 17 via the base station 15, and may further be transmitted over the internet network 69 to a variety of devices.

The terminology used throughout this specification may be interchanged with any number of terms without departing from the scope or nature of the invention. For example, the phrase "base station" may be interchanged with the phrases "radio base station," "evolved Node B (eNB)," "network node," "cell," "sector," "cell group," "carrier," "component carrier," "access point," "transmission point," "receiving point," "femto cell," and so on. Furthermore, the phrase "user equipment" as used herein may be replaced with the phrases "terminal," "mobile station," "subscriber unit," "mobile device," "wireless communication device," "mobile subscriber station," "access terminal," "handset," "user agent," "client," or a combination thereof. Finally, the term "signal" may be interchanged with the phrases "radiofrequency signal," "message," "data packets," "instructions," or equivalent without departing from the nature of the invention.

Furthermore, although the private network 11 is described as being part of a 5g network, the private network 11 may be part of a Fourth Generation (4G) system, a Long Term Evolution (LTE) network, a 4G LTE network, a New Radio system, or various other communication systems such as Ultra Mobile Broadband (UMB), Wi-Fi, or a Code-Division Multiple Access (CDMA) system. In addition, the base station 15 may be interchanged with a UE 17, such that the first security module 23 communicates with multiple UEs 17 that are arranged to communicate on side channels, or "sidelink" communication. Similarly, the UE 17 may be replaced with a second base station 15, such that the first security module 23 communicates with multiple base stations 15.

Consistent with the above, networking details that are commonly known in the art have been omitted for the sake of brevity. Such omissions include, for example, details of the structure of the radio frames, slots, and other components that are used for timing signal transmissions, as well as information concerning the control channels and scheduling channels. That is not to imply, however, that the invention is to be practiced without the use of the omitted details. Rather, the omission of such details is intended to signify that the invention may vary in these routine areas without departing from the scope or nature of this disclosure.

Accordingly, embodiments of the above invention are useful for privately and securely transmitting data to and from a data center containing enterprise data. Specifically, by forming the enterprise platform as a network slice, the enterprise platform is configured to operate at a low latency and high reliability, which is useful in situations where information accuracy is critical. Furthermore, because the enterprise platform utilizes an encrypted connection, it is difficult to access the enterprise data without transmitting a secure request to access the data that is processed through multiple security layers.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. For example, multiple private networks may be interconnected, where each enterprise platform is configured as a separate slice of the network. Furthermore, multiple base stations may connect to a singular enterprise platform at a time, and each base station may be connected to multiple UEs in a network slice. Finally, the number of security modules and protocols may be increased or decreased according to the relative security and latency requirements of the enterprise platform.

In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A system for securely transmitting data, the system comprising:
   a data network configured to connect to an internet network using an internet protocol;
   a user equipment (UE) configured to transmit a request to access enterprise data;
   a base station configured to receive the access request from the UE and forward the access request to an enterprise platform,
   wherein the enterprise platform comprises:
      a data center comprising a non-transient storage medium configured to store the enterprise data;
      an enterprise server connected to the data center, the enterprise server being configured to access the enterprise data according to the access request and process the enterprise data using one or more applications stored on the enterprise server;
      a Multi-access Edge Computing (MEC) server configured to access and receive the processed enterprise data from the enterprise server;
      a first security module configured to receive the access request from the base station, determine that an access request is secure, and forward a secure access request to the MEC server, and
      an encrypted connection configured to create a secure tunnel between the MEC server and the enterprise server,
   wherein the MEC server is configured to transmit the processed data through the first security module to the base station and the UE, and
   wherein the base station and the first security module are connected to the data network such that the enterprise platform and the base station are connected to the internet network.

2. The system of claim 1, wherein the MEC server is separated from the encrypted connection by a second security module that is configured to filter an unsecure access request transmitted by the MEC server.

3. The system of claim 2, wherein the encrypted connection is separated from the data center by a third security module configured to monitor communication between the encrypted connection and the enterprise server.

4. The system of claim 1, wherein the enterprise platform comprises a user plane function configured to perform data routing and forwarding.

5. The system of claim 1, wherein the enterprise platform comprises a management server configured to gather performance, telemetry, traffic, and configuration data from the base station or the UE.

6. The system of claim 5, wherein the management server is configured to perform security logging.

7. The system of claim 1, wherein the data network comprises a network core configured to perform authentication management, session management, policy control, location management, and network slice selection functions.

8. The system of claim 1, wherein the enterprise platform is configured as part of a network slice of the data network.

9. The system of claim 1, wherein the data network, the base station, and the enterprise platform are part of a Fifth-Generation (5G) network.

10. The system of claim 1, wherein the enterprise platform employs Multiprotocol Label Switching (MPLS) as a network traffic routing technique.

11. The system of claim 1, wherein the enterprise platform operates according to Ultra-Reliable Low Latency Communications (URLLC) requirements.

12. The system of claim 11, wherein the MEC servers perform User Plane Functions (UPF), Management Plane (M-Plane) functions, and application server functions for the enterprise platform.

13. A method for securely transmitting data, the method comprising:
    transmitting a request to access enterprise data stored on a non-transient storage medium at a data center connected to an enterprise server from a User Equipment (UE) to a base station;
    forwarding the access request from the base station to a first security module;
    determining if the access request is secure or unsecure;
    forwarding a secure access request to a Multi-access Edge Computing (MEC) server;
    creating an encrypted connection between the MEC server and the enterprise server;

accessing the enterprise data according to the secure access request;

processing the enterprise data using one or more applications stored on the enterprise server;

transmitting the processed enterprise data from the data center to the MEC server, from the MEC server to the first security module, and from the first security module to the base station and the UE, and connecting the base station and the first security module to a data network that connects to an internet network using an internet protocol.

14. The method of claim 13, further comprising: separating the MEC server from the encrypted connection by a second security module that filters an unsecure access request transmitted by the MEC server.

15. The method of claim 14, further comprising: separating the MEC server from the encrypted connection by a third security module that monitors communication between the encrypted connection and the enterprise server.

16. The method of claim 14, further comprising: gathering performance, telemetry, traffic, and configuration data from the base station and the UE.

17. The method of claim 14, further comprising: routing network traffic between the MEC server, the enterprise server, and the data center using Multiprotocol Label Switching (MPLS).

18. The method of claim 14, further comprising: determining and storing access information concerning the data center.

19. The method of claim 18, wherein the access information includes a time at which the enterprise data is transmitted from the data center, access credentials of the base station or the UE, and telemetry data of the base station or the UE.

20. The method of claim 14, further comprising: slicing the data network, and configuring the data center, the enterprise server, the MEC server, the first security module, and the encrypted connection as a slice of the data network.

* * * * *